US011085699B2

(12) United States Patent
Graves

(10) Patent No.: US 11,085,699 B2
(45) Date of Patent: Aug. 10, 2021

(54) HEAT EXCHANGER WITH CROSSOVER PASSAGES FOR COLD FLUID DISTRIBUTION

(71) Applicant: Dana Canada Corporation, Oakville (CA)

(72) Inventor: Garreth D. G. Graves, Mississauga (CA)

(73) Assignee: Dana Canada Corporation, Oakville (CA)

( * ) Notice: Subject to any disclaimer, the term of this patent is extended or adjusted under 35 U.S.C. 154(b) by 150 days.

(21) Appl. No.: 16/688,390

(22) Filed: Nov. 19, 2019

(65) Prior Publication Data

US 2021/0148639 A1 May 20, 2021

(51) Int. Cl.
*F28F 3/12* (2006.01)
*F28D 1/03* (2006.01)
*H01M 10/613* (2014.01)
*H01M 10/625* (2014.01)
*B60H 1/00* (2006.01)
*H01M 6/50* (2006.01)

(52) U.S. Cl.
CPC ............. *F28D 1/0383* (2013.01); *F28F 3/12* (2013.01); *B60H 1/00278* (2013.01); *F28F 2210/10* (2013.01); *H01M 6/5038* (2013.01); *H01M 10/613* (2015.04); *H01M 10/625* (2015.04)

(58) Field of Classification Search
CPC ...... F28F 3/12; F28F 2210/10; H01M 10/625; H01M 10/613; H01M 6/5038; B60H 1/00278
See application file for complete search history.

(56) References Cited

U.S. PATENT DOCUMENTS 2,900,175 A * 8/1959 McGuffey ................. F28F 3/12
165/170
3,424,238 A * 1/1969 McWilliams ............. F28F 3/12
165/170
(Continued)

FOREIGN PATENT DOCUMENTS

WO 2013037869 A 9/2013
WO 2013139905 A1 9/2013

OTHER PUBLICATIONS

Machine English Translation of Japanese Patent No. 2013-037869A Feb. 21, 2021.

*Primary Examiner* — Leonard R Leo
(74) *Attorney, Agent, or Firm* — Ridout & Maybee LLP

(57) ABSTRACT

A heat exchanger has a pair of opposed walls and an interior space between the walls, and first and second areas located on opposite sides of a longitudinal axis, each adapted for thermal contact with a battery cell. Inlet and outlet ports are provided in the respective first and second areas, and a flow barrier extends along the longitudinal axis and separates the first and second areas. Fluid flow passages are defined in the first and second areas. A first crossover passage extends across the longitudinal axis from the inlet port to an inlet flow passage in the second area. A second crossover passage extends across the longitudinal axis from an outlet flow passage in the first area to the outlet port. A crossover housing is provided inside or outside the interior space and extends across the longitudinal axis, enclosing at least one of the first and second crossover passages.

21 Claims, 14 Drawing Sheets

(56) References Cited

U.S. PATENT DOCUMENTS

| | | | | |
|---|---|---|---|---|
| 7,448,436 | B2* | 11/2008 | Katoh | F28F 9/0202 |
| | | | | 165/176 |
| 7,516,781 | B2* | 4/2009 | Kamiyama | F28F 3/12 |
| | | | | 165/170 |
| 8,297,343 | B2* | 10/2012 | Yang | F28D 15/02 |
| | | | | 165/104.11 |
| 9,291,405 | B2 | 3/2016 | Pentapati et al. | |
| 10,006,722 | B2* | 6/2018 | Kenney | H01M 10/625 |
| 2011/0168470 | A1 | 7/2011 | George et al. | |
| 2012/0148889 | A1 | 6/2012 | Fuhr et al. | |
| 2013/0189557 | A1 | 7/2013 | Haussmann | |
| 2015/0303537 | A1 | 10/2015 | Jung et al. | |
| 2016/0359211 | A1* | 12/2016 | Kenney | F28F 3/12 |
| 2017/0324132 | A1* | 11/2017 | Kenney | F28F 3/12 |
| 2018/0131051 | A1 | 5/2018 | Paramasivam et al. | |
| 2018/0205125 | A1* | 7/2018 | Burgers | F28F 3/12 |

* cited by examiner

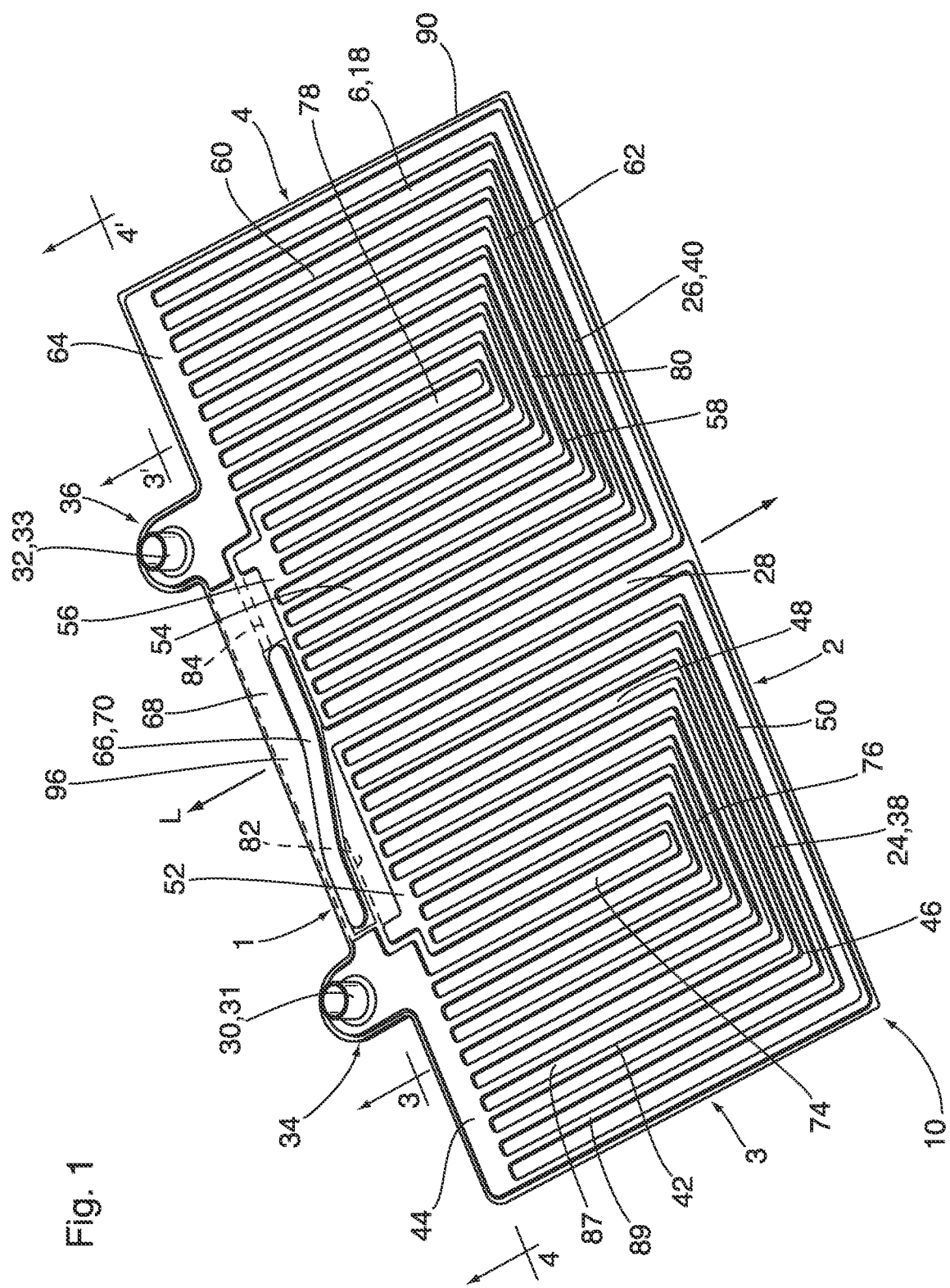

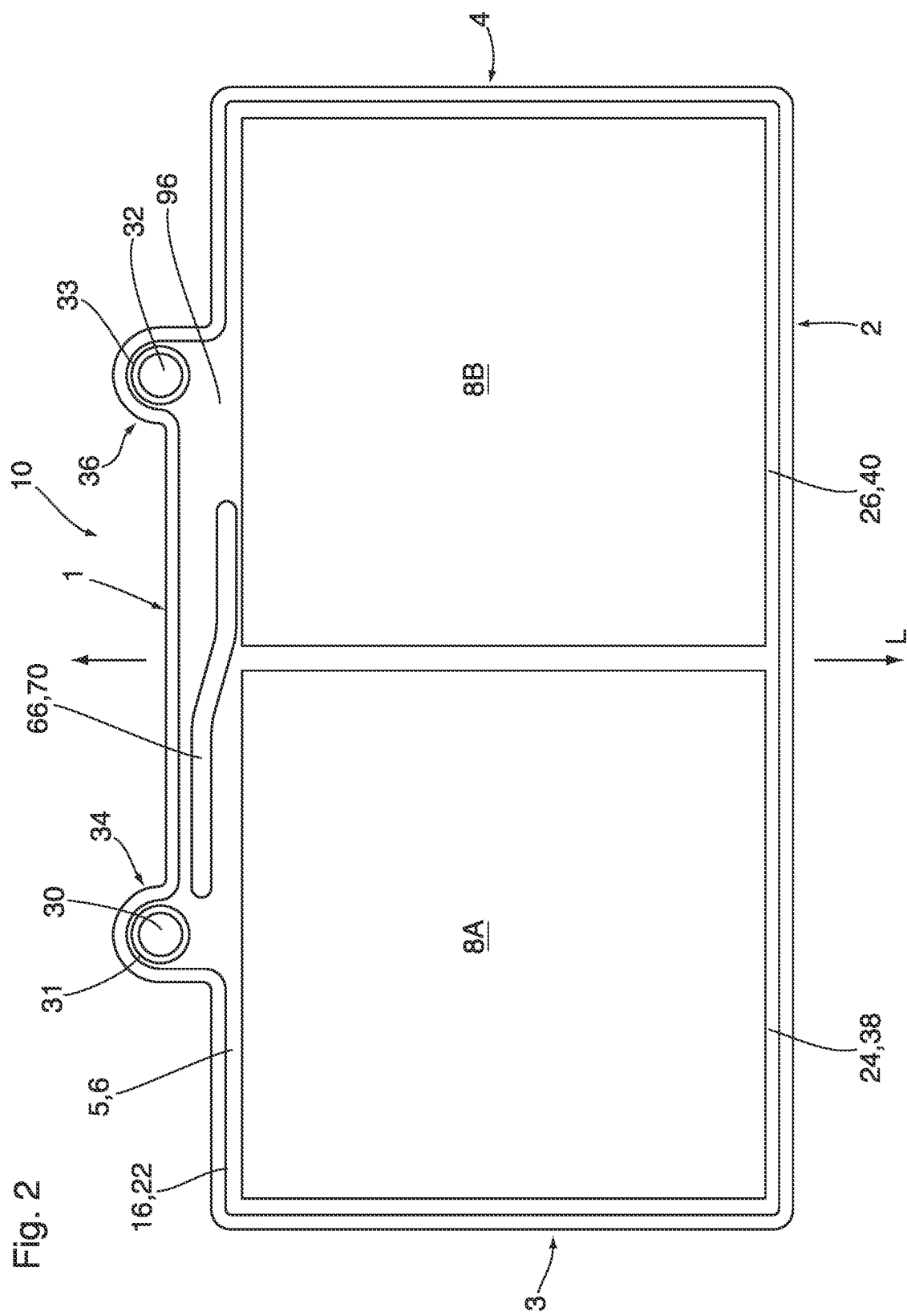

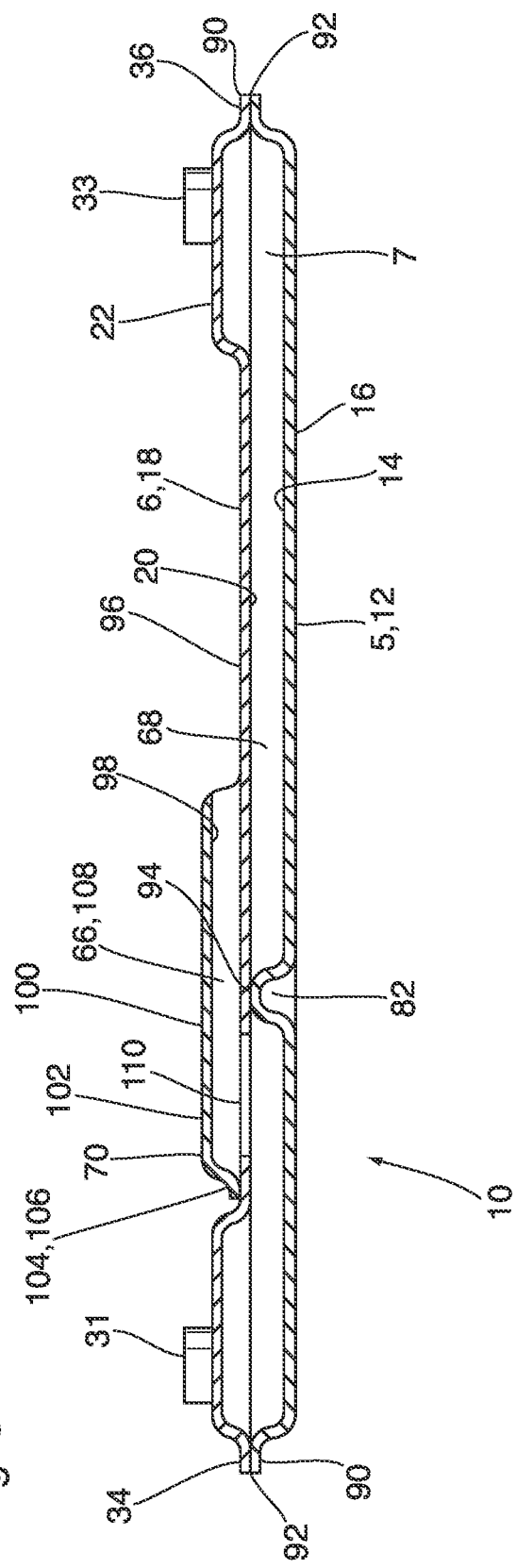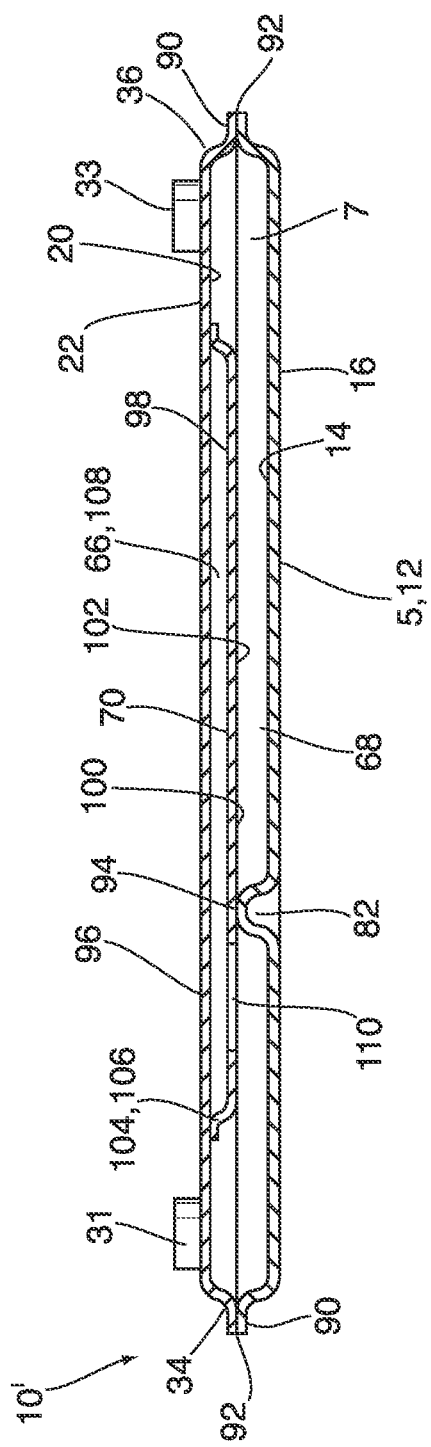

HEAT EXCHANGER WITH CROSSOVER PASSAGES FOR COLD FLUID DISTRIBUTION

TECHNICAL FIELD

The present disclosure relates to thermal management of rechargeable batteries within an energy storage system of a battery electric vehicle (BEV) or hybrid electric vehicle (HEV), and particularly to heat exchangers adapted for cooling multiple battery cells.

BACKGROUND

Energy storage systems such as those used in BEVs and HEVs comprise rechargeable lithium-ion batteries. A typical rechargeable battery for a BEV or HEV comprises a number of battery modules which are electrically connected together in series and/or in parallel to provide the battery with the desired system voltage and capacity. Each battery module comprises a plurality of battery cells which are electrically connected together in series and/or parallel, wherein the battery cells may be in the form of pouch cells, prismatic cells or cylindrical cells.

Rechargeable vehicle batteries in BEVs and HEVs generate large amounts of heat that needs to be dissipated, therefore these types of batteries or battery systems need to be cooled to extend their service life.

Liquid cooled heat exchangers can be used to manage the thermal load of these rechargeable vehicle batteries. These battery heat exchangers typically comprise "cold plate" heat exchangers or "ICE" ("inter-cell elements") plate heat exchangers. A cold plate heat exchanger has a flat upper surface upon which one or more battery cells is arranged, wherein the number of battery cells associated with each cold plate is variable and may, depending on the area of the cold plate, comprise one or more battery modules. Typically, the battery cells arranged on the cold plate will be prismatic cells or cylindrical cells, which are housed in rigid containers. ICE plate heat exchangers are arranged or "sandwiched" between the adjacent pouch cells or prismatic cells, the individual ICE plate heat exchangers being fluidically connected together by common inlet and outlet manifolds.

Maintaining adequate temperature uniformity across the surface of a battery heat exchanger is an important consideration in the thermal management of energy storage systems, as it ensures that there is a minimum temperature differential within the individual battery cells and between adjacent battery cells or rows of cells. Because the temperature of a heat transfer fluid is higher at the outlet than at the inlet, maintaining adequate temperature uniformity is particularly difficult in "multi-pass" flow configurations (e.g. U-flow or serpentine) where one or more battery cells are in contact with an inlet side of the heat exchanger and one or more battery cells are in contact with an outlet side of the heat exchanger.

There is a need for battery heat exchangers which achieve improved temperature uniformity across surfaces which are in contact with battery cells.

SUMMARY

In accordance with an aspect of the present disclosure, there is provided a heat exchanger comprising: (a) a pair of opposed walls; (b) an interior space between the walls; (c) a first area and a second area located on opposite sides of a longitudinal axis; (d) a flow barrier extending along the longitudinal axis between the first and second areas; (e) an inlet port in the first area and an outlet port in the second area; (f) a first plurality of fluid flow passages defined within the interior space in the first area, wherein the first plurality of fluid flow passages comprises a first inlet flow passage having a first end and a second end, and a first outlet flow passage having a first end and a second end, wherein the first end of the first inlet flow passage is in flow communication with the inlet port; (g) a second plurality of fluid flow passages defined within the interior space in the second area, wherein the second plurality of fluid flow passages comprises a second inlet flow passage having a first end and a second end, and a second outlet flow passage having a first end and a second end, wherein the second end of the second outlet flow passage is in flow communication with the outlet port; (h) a first crossover passage extending from the inlet port to the first end of the second inlet flow passage, wherein the first crossover passage extends across the longitudinal axis from the first area to the second area; (i) a second crossover passage extending from the second end of the first outlet flow passage to the outlet port, wherein the second crossover passage extends across the longitudinal axis from the first area to the second area; and (j) a crossover housing provided on an inner surface or an outer surface of one of the walls and extending across the longitudinal axis from the first area to the second area; wherein at least one of the first and second crossover passages is located inside the crossover housing.

BRIEF DESCRIPTION OF THE DRAWINGS

Exemplary embodiments of the present disclosure will now be described, by way of example, with reference to the accompanying drawings, in which:

FIG. 1 is a perspective view of a heat exchanger according to a first embodiment;

FIG. 2 is an elevation view of the heat exchanger of FIG. 1;

FIG. 3A is a cross section along line 3-3' of FIG. 1 illustrating a heat exchanger with an external crossover housing;

FIG. 3B is a cross section along line 3-3' of FIG. 1 illustrating a heat exchanger with an internal crossover housing;

DETAILED DESCRIPTION

Figure 4A:
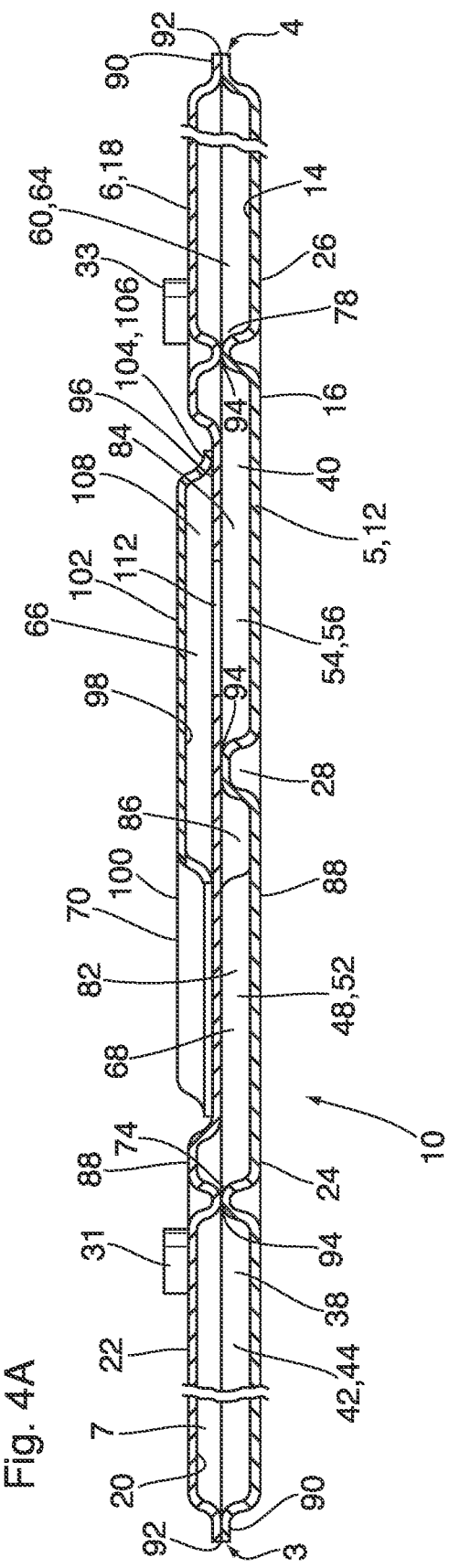
FIG. 4A is a cross section along line 4-4' of FIG. 1 illustrating a heat exchanger with an external crossover housing.

The heat exchangers described herein are generally flat, planar fluid-carrying panels having opposed outer surfaces, at least one of the outer surfaces being adapted for thermal contact with one or more battery cells and/or battery module(s) of a rechargeable battery of a BEV or HEV.

A heat exchanger 10 according to a first embodiment is now described with reference to FIGS. 1 to 7. Heat exchanger 10 has a length, along a longitudinal axis L, between first and second ends 1, 2; and a width, transverse to axis L, between first and second sides 3, 4. Heat exchanger 10 comprises a pair of opposed first and second walls 5, 6, which are generally flat and planar, and which are spaced apart from one another with an interior space 7 being defined between the walls 5, 6.

In the present embodiment, walls 5, 6 are defined by first and second plates 12, 18. First plate 12 has inner and outer surfaces 14, 16 and second plate 18 has inner and outer surfaces 20, 22. The inner surfaces 14, 20 of plates 12, 18 define the inner surfaces of walls 2, 4 and face inwardly toward the interior space 7 of heat exchanger 10. The outer surfaces 16, 22 of plates 12, 18 define the outer surfaces of walls 5, 6 and face outwardly away from the interior space 7. At least one of the outer surfaces 16, 22 is adapted for thermal contact with one or more battery cells 8. For example, FIG. 2 shows the outlines of two battery cells 8A and 8B arranged end-to-end, and in thermal contact with one of the outer surfaces 16, 22. The battery cells 8A, 8B are shown as being square or rectangular, although other shapes are possible. Thermal contact between outer surfaces 16, 22 and battery cells 8 may be enhanced by a thin layer of thermal interface material (TIM) (not shown) between the outer surface 16, 22 and an adjacent surface of a battery cell 8. The TIM may comprise a thermally conductive grease, wax or metallic material.

The heat exchanger 10 comprises a first area 24 and a second area 26 located on opposite sides of the longitudinal axis L. The longitudinal axis L in the present example is a central longitudinal axis which bisects the heat exchanger 10, such that first area 24 is equal to second area 26, however, this is not essential in all embodiments. Furthermore, it can be seen from FIG. 2 that first area 24 is substantially equal to or greater than the area of battery cell 8A and second area 26 is substantially equal to or greater than the area of battery cell 8B. Therefore, first area 24 is arranged for heat transfer with battery cell 8A whereas second area 26 is arranged for heat transfer with battery cell 8B.

Figure 5:
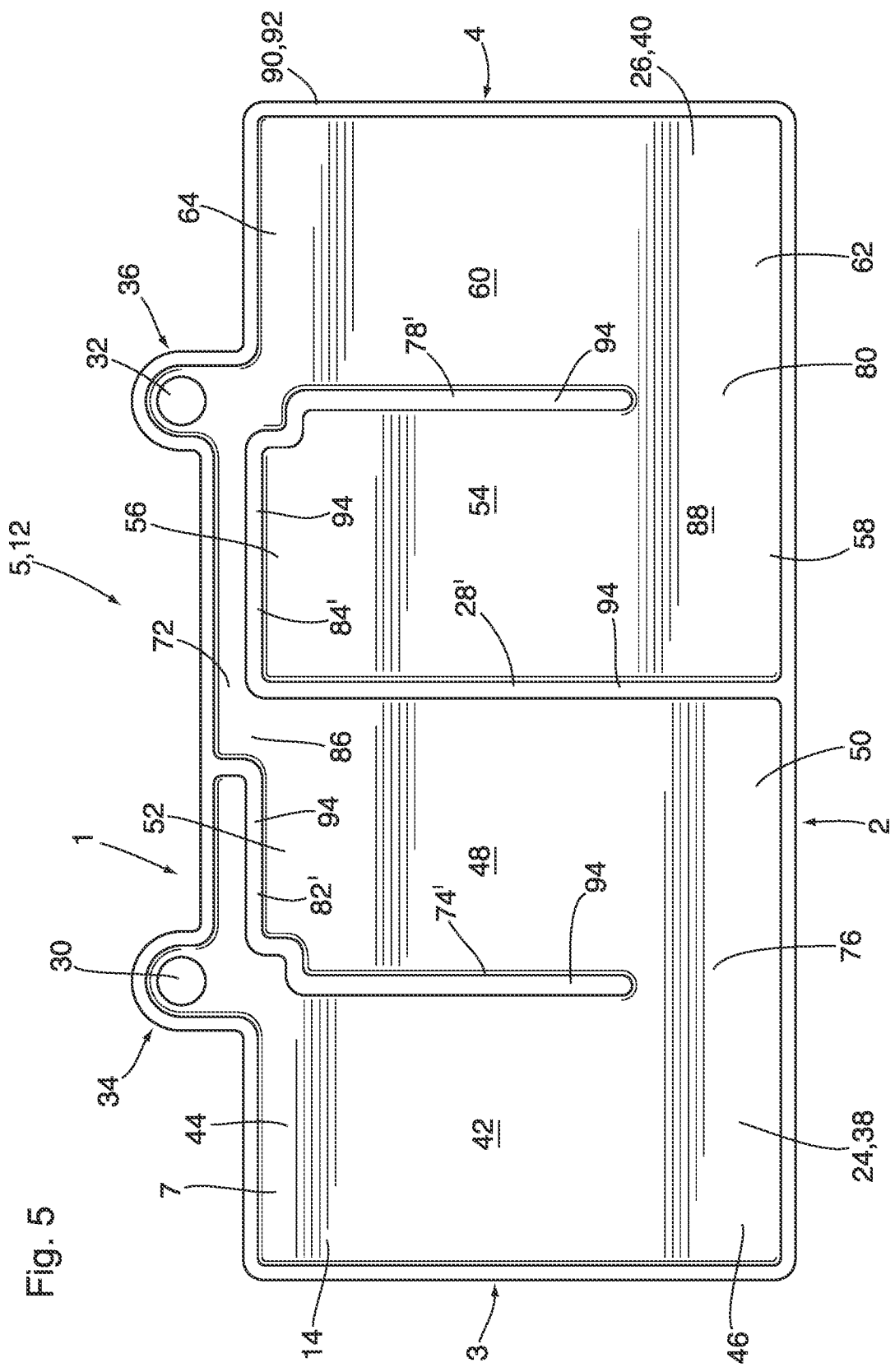
FIG. 5 is a plan view of the first plate of the heat exchanger of FIG. 1.
Figure 6A:
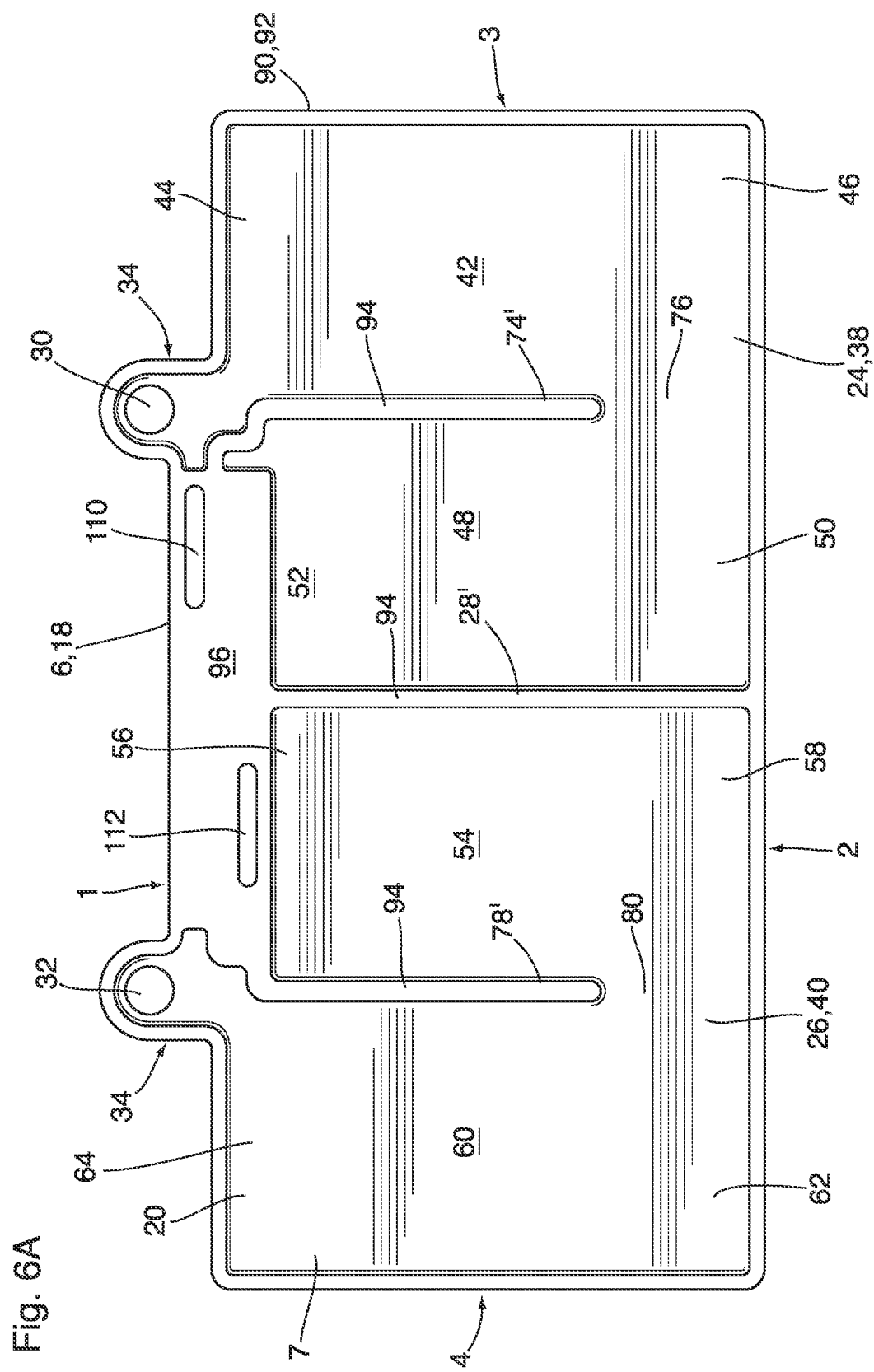
FIG. 6A is a plan view of the second plate of the heat exchanger of FIG. 1 having an external crossover housing.
Figure 6B:
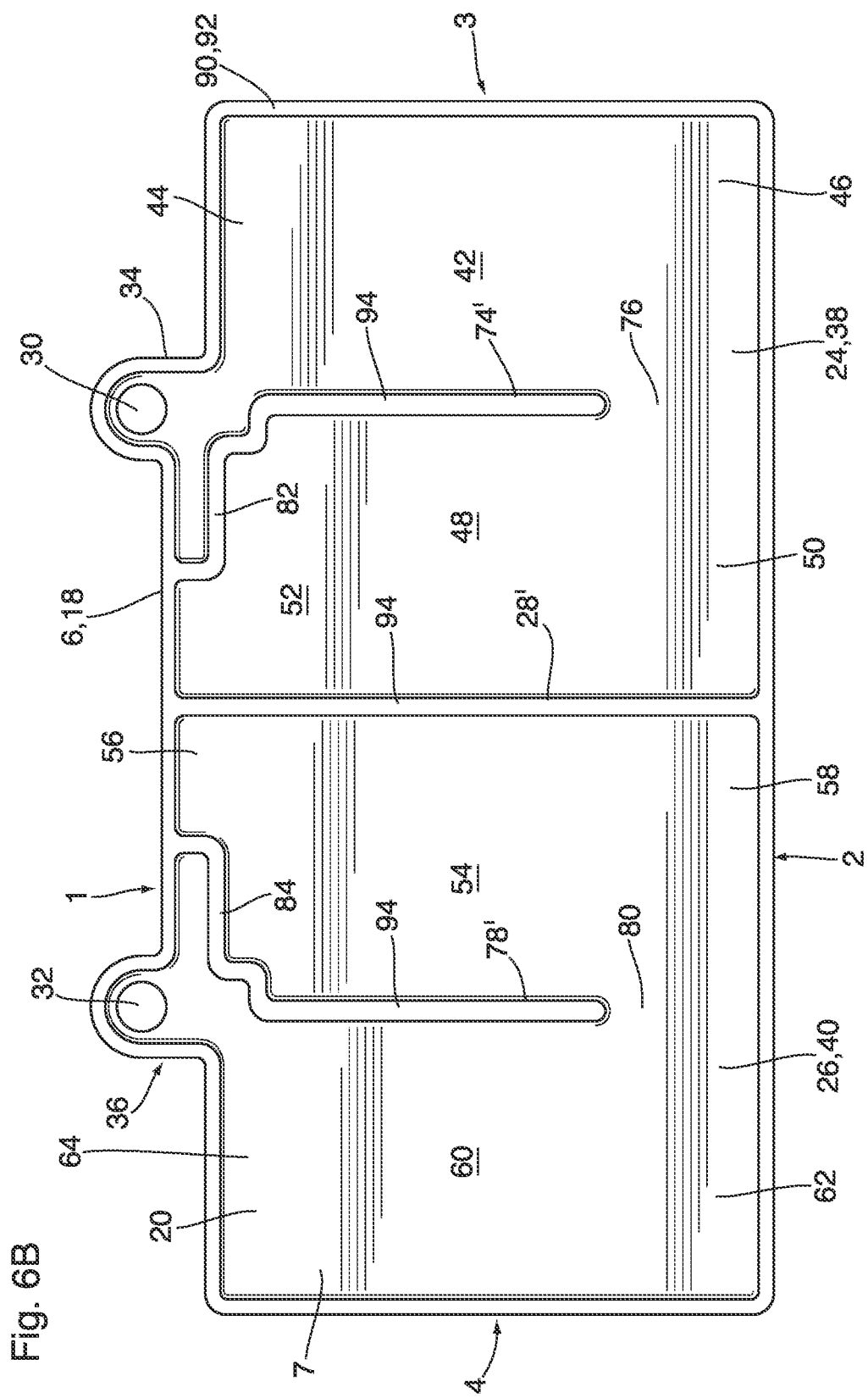
FIG. 6B is a plan view of the second plate of a heat exchanger having an internal crossover housing.
Figure 7:
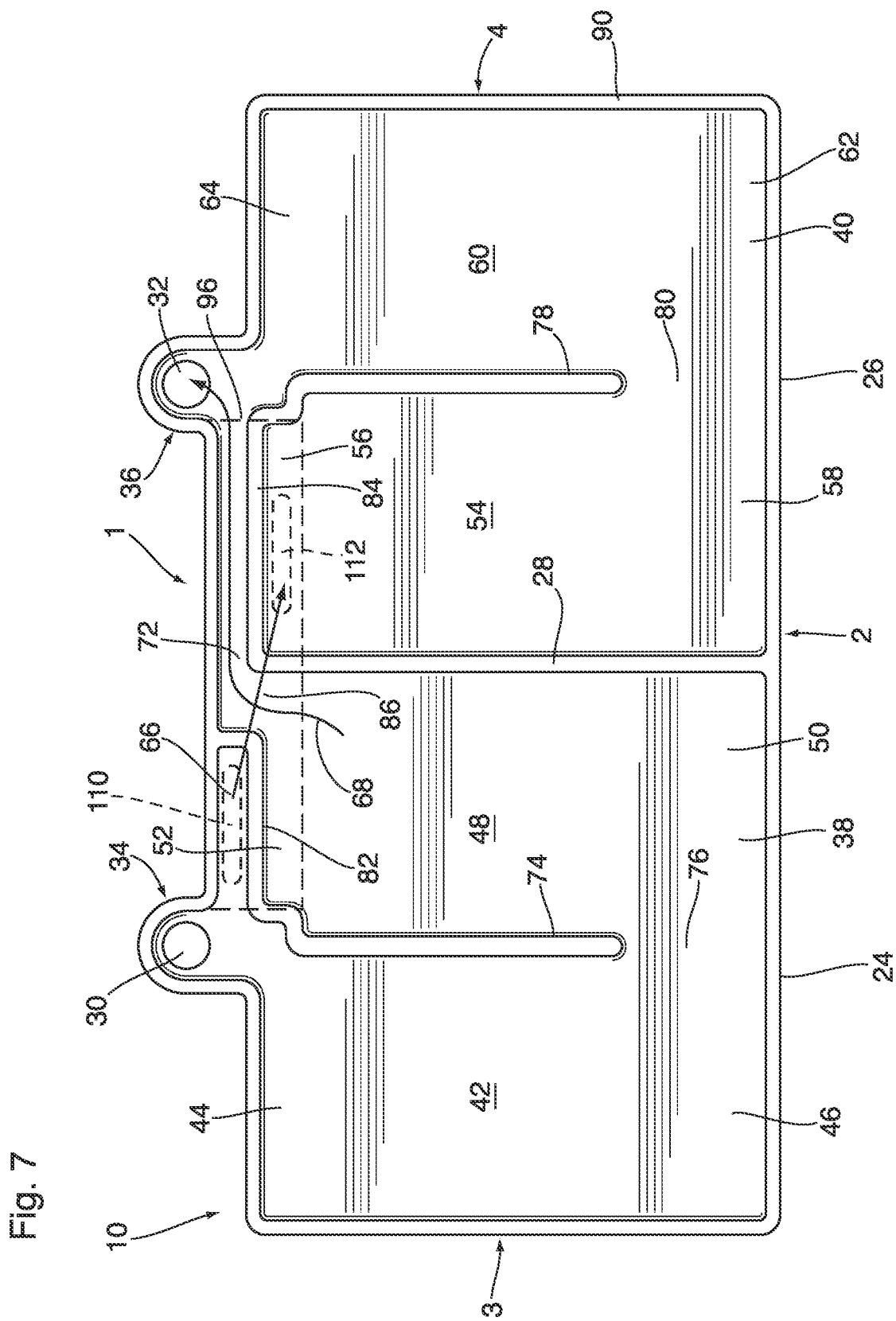
FIG. 7 is an explanatory plan view of the heat exchanger of FIG. 1.

FIGS. 5-7 are explanatory views in which the rib pattern has been simplified for the purpose of explaining the features and benefits of heat exchanger 10. As shown in FIG. 7, a flow barrier 28 extends along the longitudinal axis between the first and second areas 24, 26, the flow barrier 28 substantially preventing transverse fluid flow across the longitudinal axis L, such that each area 24, 26 substantially operates as an independent heat exchanger to transfer heat to and/or from one of the battery cells 8A, 8B.

Heat exchanger 10 also includes an inlet port 30 and an outlet port 32, wherein the inlet port 30 is located in the first area 24, and the outlet port 32 is located in the second area 26. In the present embodiment, the inlet and outlet ports 30, 32 are in the form of aligned through-holes in the first and second walls 5, 6 (e.g. plates 12, 18), and are formed in respective semi-circular extensions or protrusions 34, 36 extending in the longitudinal direction and lying outside portions of areas 24, 26 which are in thermal contact with battery cells 8A, 8B. The inlet and outlet are both located proximate to the first end 1 of heat exchanger 10.

As shown in FIGS. 1-3, the inlet and outlet ports 30, 32 are provided with tubular inlet and outlet fittings 31, 33 extending perpendicular to the plane of heat exchanger 10. However, it will be appreciated that various configurations of inlet and outlet ports are possible, depending on application-specific requirements. For example, the ports 30, 32 may instead be formed in the edges of the plates 12, 18, and may be provided with side-entry fittings which may be parallel to the plane of heat exchanger 10.

Each area 24, 26 of heat exchanger 10 includes a plurality of fluid flow passages defined within the interior space 7. In this regard, a first plurality of fluid flow passages 38 is defined within the interior space 7 in the first area 24, and a second plurality of fluid flow passages 40 is defined within the interior space 7 in the second area 26.

The first plurality of fluid flow passages 38 includes a first inlet flow passage 42 having a first end 44 and a second end 46, and a first outlet flow passage 48 having a first end 50 and a second end 52. The first end 44 of first inlet flow passage 42 and the second end 52 of first outlet flow passage 48 are proximate to the first end 1 of heat exchanger 10, while the second end 46 of first inlet flow passage 42 and the first end 56 of first outlet flow passage 48 are proximate to the second end 2. The first end 44 of the first inlet flow passage 42 is in flow communication with the inlet port 30, to receive heat transfer fluid therefrom.

The second plurality of fluid flow passages 40 includes a second inlet flow passage 54 having a first end 56 and a second end 58, and a second outlet flow passage 60 having a first end 62 and a second end 64. The first end 56 of second inlet flow passage 54 and the second end 64 of second outlet flow passage 60 are proximate to the first end 1 of heat exchanger 10, while the second end 58 of second inlet flow passage 54 and the first end 62 of second outlet flow passage 60 are proximate to the second end 2. The second end 64 of second outlet flow passage 60 is in flow communication with the outlet port 32, to discharge heat transfer fluid thereto.

The heat exchanger 10 further comprises a first crossover passage 66 to provide flow communication between the inlet port 30 and the second inlet flow passage 54, and a second crossover passage 68 to provide flow communication between the outlet port 32 and the first outlet flow passage 48. These crossover passages 66, 68 are now described below.

As can be seen in the drawings, the first crossover passage 66 extends from the inlet port 30 to the first end 56 of the second inlet flow passage 54, and extends across the longitudinal axis L from the first area 24 to the second area 26. The second crossover passage 68 extends from the second end 52 of the first outlet flow passage 48 to the outlet port 32, and extends across the longitudinal axis L from the first area 24 to the second area 26.

Heat exchanger 10 further comprises a crossover housing 70 provided inside or outside the interior space 7, and on an inner surface 14, 20 or an outer surface 16, 22 of one of the walls 5, 6, and extending across the longitudinal axis L from the first area 24 to the second area 26. At least one of the crossover passages 66, 68 is located inside the crossover housing 70. In particular, FIGS. 1, 2, 3A, 4A and 6A relate to a heat exchanger 10 having an external crossover housing 70, while FIGS. 3B, 4B and 6B relate to a heat exchanger 10' having an internal crossover housing 70, i.e. between the inner surfaces 14, 20 of first and second plates 12, 18 (i.e. walls 5, 6). FIGS. 5 and 7-9 relate to heat exchangers having either an internal or an external crossover housing 70.

In the present embodiment, the first crossover passage 66 located inside crossover housing 70 and the second crossover passage 68 is located inside the interior space 7, i.e. along the interior surface 14 of first wall 5 and first plate 12. The second crossover passage 68 extends substantially transverse to the longitudinal axis L through a gap 72 provided in the flow barrier 28, proximate to the first end 1 of heat exchanger 10.

The crossover passages 66, 68 may at least partly overlap one another. In the present embodiment, both crossover passages 66, 68 are located proximate to the first end 1 of heat exchanger 10, and extend substantially transverse to the longitudinal axis L between the extensions 34, 36 in which the inlet and outlet ports 30, 32 are provided. The crossover passages 66, 68 may both be at least partially located outside portions of areas 24, 26 which are in thermal contact with battery cells 8A, 8B.

The first crossover passage 66 delivers relatively cool heat transfer fluid from the inlet port 30 directly to the first end 56 of the second inlet flow passage 54, thereby bypassing the first plurality of fluid flow passages 38 and ensuring that the heat transfer fluid received from the inlet port 30 by the first and second pluralities of fluid flow passages 38, 40 is at a relatively uniform temperature. The second crossover passage 68 delivers relatively warm heat transfer fluid from the second end 52 of the first outlet flow passage 48 directly to the outlet port 32, thereby bypassing the second plurality of fluid flow passages 40 and ensuring that the heat transfer fluid discharged to the outlet port 32 from the first and second pluralities of fluid flow passages 38, 40 is at a relatively uniform temperature. This arrangement provides better temperature uniformity across the surface of heat exchanger 10, and a lower temperature differential between battery cells 8A and 8B, than in prior art arrangements where the entire volume of heat transfer fluid follows a simple U-shaped or serpentine flow pattern from an inlet side of the heat exchanger to an outlet side of the heat exchanger.

Due to the overlap between the first and second crossover passages 66, 68 of heat exchanger 10, there may be some conductive heat transfer between the fluid flowing through the crossover passages 66, 68. However, the inventor has found that this has a minimal impact on overall temperature uniformity.

The first and second crossover passages 66, 68 of heat exchanger 10 are partly defined by first and second crossover passage walls 82, 84, which separate the (internal) second crossover passage 68 from the first outlet flow passage 48 and the second inlet flow passage 54, wherein the second crossover passage 68 extends through a gap 86 between the crossover passage walls 82, 84.

In the present embodiment, each of the first and second pluralities of fluid flow passages 38, 40 defines a U-shaped fluid flow pattern. In this regard, the first inlet flow passage 42 is separated from the first outlet flow passage 48 by a longitudinally extending first dividing wall 74, with the second end 46 of the first inlet flow passage 42 being in flow communication with the first end 50 of the first outlet flow passage 48 through a gap 76 provided in the first dividing wall 74. The gap 76 is located proximate to the second end 2 of heat exchanger 10, i.e. opposite to the first end 1 at which the inlet port 30 is located.

Similarly, the second inlet flow passage 54 is separated from the second outlet flow passage 60 by a longitudinally extending second dividing wall 78, with the second end 56 of the second inlet flow passage 54 being in flow communication with the first end 62 of the second outlet flow passage 60 through a gap 80 provided in the second dividing wall 78. The gap 80 is located proximate to the second end 2 of heat exchanger 10, i.e. opposite to the first end 1 at which the outlet port 32 is located.

In the present embodiment, the dividing walls 74, 78 are substantially centrally located in areas 24, 26, such that the inlet and outlet flow passages are of substantially the same area, however, this is not required in all embodiments. Furthermore, as shown in FIG. 1, each of the flow passages 42, 48, 54, 60 is provided with one or more channel walls 87 to subdivide the flow passages 42, 48, 54, 60 into a plurality of flow channels 89. The channel walls 87 may be provided to enhance heat transfer and/or to provide structural support for walls 5, 6. In the present embodiment, the channel walls 87 in each area 24, 26 are in the form of a plurality of nested U-shaped walls, between which are defined a plurality of U-shaped channels 89 adapted for flow of the heat transfer fluid. Each channel wall 87 and channel 89 has a pair of longitudinally-extending legs and a transverse connecting portion extending through one of the gaps 76, 80.

The first crossover passage wall 82 extends transversely from an end of the first dividing wall 74 and the second crossover passage wall 84 extends transversely between an end of the flow barrier 28 and an end of the second dividing wall 78.

One or both of the plates 12, 18 defining the walls 5, 6 of heat exchanger 10 may be in the form of an embossed plate. In the present embodiment, both the first and second plates 12, 18 are embossed, each having been shaped, for example by stamping, drawing or molding, to provide a plurality of embossments which together define a central area 88 having a plurality of ribs surrounded on all sides by a raised planar flange 90 defining a planar peripheral sealing surface 92 on the inner surface 14, 20 of each plate 12, 18. The first and second plates 12, 18 are sealingly joined together with their inner surfaces 14, 20 in opposed facing relation to one another, with the planar peripheral sealing surfaces 92 of first and second plates 12, 18 being sealingly joined together and with portions of central areas 88 being spaced apart. The plates 12, 18 may be comprised of aluminum or alloys thereof, and may be joined together by brazing in a brazing oven.

The ribs in the central areas 88 of the first and second plates 12, 18 have sealing surfaces 94 which are co-planar with the peripheral sealing surface 92, and which are sealingly joined together to define the flow barrier 28 and the dividing walls 74, 78. Accordingly, in FIGS. 5, 6A and 6B, which show the individual plates, the ribs are identified with corresponding primed numbers 28', 74' and 78'. Although not shown in FIGS. 5, 6A and 6B, it will be appreciated that the same comments apply to the ribs of plates 12, 18 which combine to form channel walls 87.

In the area of the crossover passages 66, 68, the first plate 12 is formed with ribs which define the crossover passage walls 82, 84 and are identified in FIGS. 5, 6A and 6B with corresponding primed numbers 82', 84', these ribs also having sealing surfaces 94. The second plate 18 has a different configuration in the area of crossover passages 66, 68. Instead of ribs, the second plate 18 is provided with a flat area 96 which extends throughout the area in which the crossover passages 66, 68 are provided.

Where the crossover housing 70 is external, the second plate 18 has the appearance shown in FIG. 6A, wherein the flat area 96 is co-planar with the peripheral sealing surface 92 of planar flange 90, and with the sealing surfaces 94 of ribs 82', 84'. Along the inner surface 20 of second plate 18, this flat area 96 is sealingly joined to the sealing surfaces 94 of ribs 82', 84' to enclose the second crossover passage 68. Along the outer surface 22 of second plate 18, the flat area 96 is sealingly joined to the crossover housing 70.

On the other hand, where the crossover housing 70 is internal, the second plate 18 has the appearance shown in FIG. 6B, wherein the flat area 96 is raised relative to the peripheral sealing surface 92 of planar flange 90, and may be co-planar with other areas of plate 18 which are raised above planar flange 90, such as the areas surrounding the inlet and outlet ports 30, 32, and/or areas which are adapted for thermal contact with battery cells 8A, 8B.

The crossover housing 70 may be shaped from a sheet of metal, such as aluminum or an alloy thereof, having an inner surface 98 and an opposite outer surface 100. The crossover housing 70 is shaped, for example by stamping, drawing or molding, to define a central area 102 surrounded by a raised planar flange 104 defining a planar peripheral sealing surface 106 on the inner surface 98 thereof. Where the crossover housing 70 is external, the first crossover passage 66 is defined by an enclosed space 108 between the central area 102 of crossover housing 70 and the outer surface 22 of the second plate 18, in the flat area 96 thereof. Where the crossover housing 70 is internal, the first crossover passage 66 is defined by an enclosed space 108 between the central area 102 of crossover housing 70 and the inner surface 20 of the second plate 18, in the flat area 96 thereof.

A plurality of holes are provided for flow communication between the enclosed space 108 of crossover housing 70 and the interior space 7 of heat exchanger 10. In this regard, a first crossover hole 110 is provided over an area of first plate 12 which is in flow communication with inlet port 30, and which is otherwise enclosed between the first crossover passage wall 82 and the planar flange 90 of first plate 12. Therefore, the first crossover passage wall 82 directs the flow of heat transfer fluid from the inlet port to the first crossover hole 110 and into the first crossover passage 66.

A second crossover hole 112 is provided over an area of first plate 12 which is part of or in flow communication with the first end 56 of the second inlet flow passage 54. Therefore, the heat transfer fluid flows through the first crossover passage 66 from the first crossover hole 110 to the second crossover hole 112, from where it enters the second inlet flow passage 54.

Where an external crossover housing 70 is provided, the first and second crossover holes 110, 112 are provided in the second plate 18 (second wall 6) to provide flow communication between the enclosed space 108 of the crossover housing 70 and the interior space 7 between the first and second walls 5, 6, as shown in FIG. 6A. However, where an internal crossover housing 70 is provided, the second plate 18 is free of holes, as shown in FIG. 6B. Instead, the first and second crossover holes 110, 112 are provided in the central area 102 of crossover housing 70 to provide flow communication between the enclosed space 108 of the crossover housing 70 and the interior space 7 between the first and second walls 5, 6, as shown in FIG. 6B, the holes 110, 112 being shown in dotted lines in FIG. 8.

In the case of an external crossover housing 70, the flat area 96 in second plate 18 reduces the height of the interior space 7 to about half of the height of the first and second pluralities of fluid flow passages 38, 40 in other portions of the heat exchanger 10. Similarly, in the case of an internal crossover housing 70, the crossover housing 70 reduces the height of interior space 7 to about half of the height of the first and second pluralities of fluid flow passages 38, 40 in other portions of the heat exchanger 10. However, the provision of flat area 96 accomplishes two goals. Firstly, providing the flat area 96 ensures that the inner surface 20 or the outer surface 22 of second plate 18 has a continuous, flat surface along which the second plate 18 can be sealingly joined to the sealing surface 106 of crossover housing 70. Secondly, providing the flat area 96 permits the outer surface 100 of the crossover housing 70 to be substantially co-planar with adjacent portions of the outer surface 22 of second plate 18, at least where the crossover housing 70 has a similar height as the second plate 18, where the crossover housing 70 is external. In the case of an internal crossover housing 70, the outer surface 22 of second plate 18 in the flat area 96 may be coplanar with other portions of the outer surface 22, for example the areas which are adapted for thermal contact with battery cells 8A, 8B, and spaced from the peripheral sealing surface 92 in a thickness dimension of the second plate 18. This assists in ensuring adequate thermal contact between heat exchanger 10 and battery cells 8 throughout their entire areas.

Figure 4B:
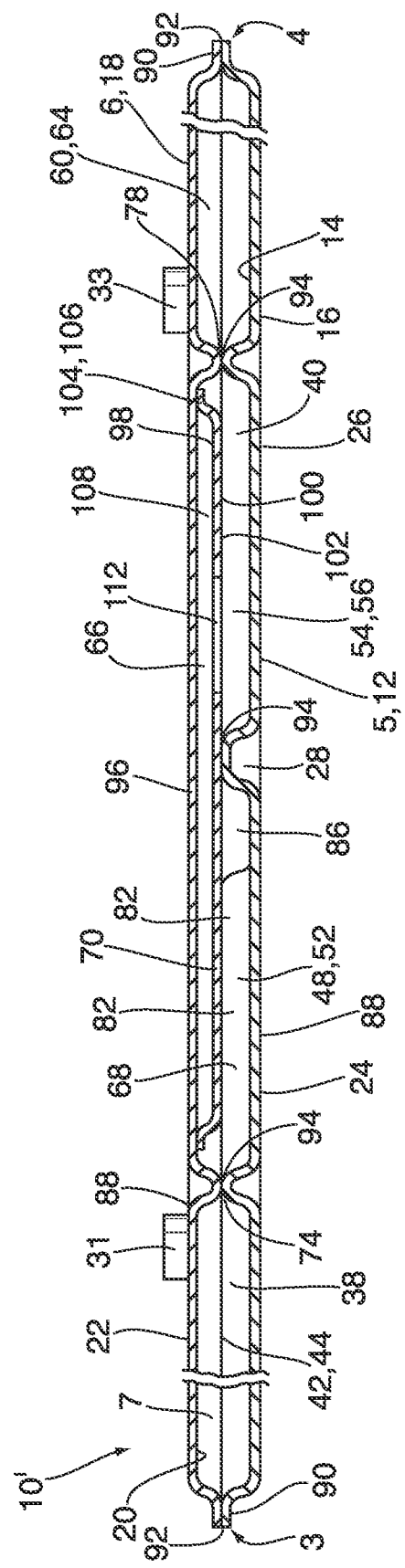
FIG. 4B is a cross section along line 4-4' of FIG. 1 illustrating a heat exchanger with an internal crossover housing.
Figure 8:
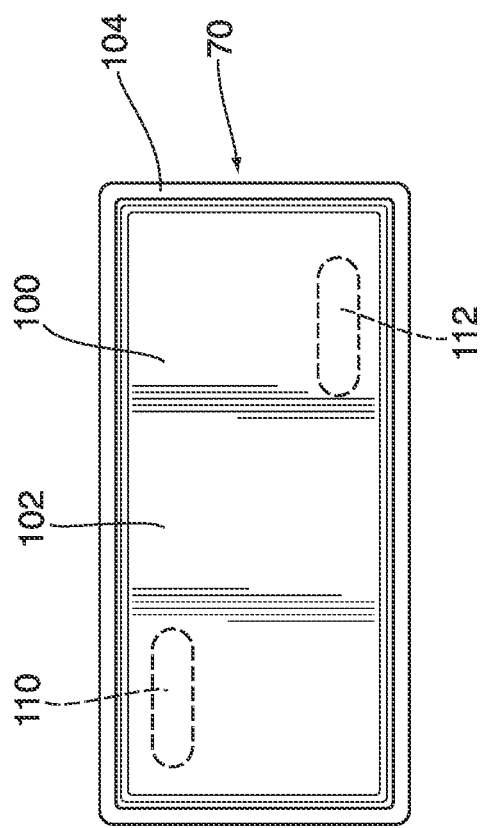
FIG. 8 is a plan view of an alternative crossover housing.
Figure 9:
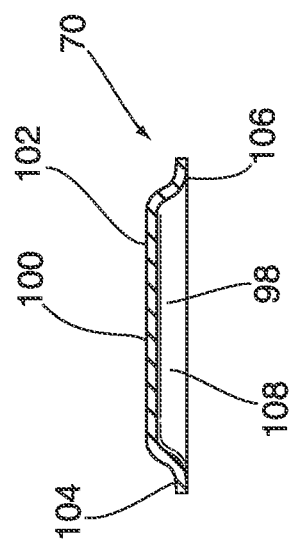
FIG. 9 is a cross-section along line 9-9' of FIG. 8.

The external crossover housing 70 is shown in FIGS. 1, 2, 3A and 4A as having an elongate shape, comprising a narrow channel extending directly between the crossover holes 110, 112. FIGS. 8 and 9 show an alternate form of crossover housing 70 having a simple rectangular shape conforming to the shape of flat area 96 of second plate 18. Where the crossover housing 70 is used as an external crossover housing, there are no crossover holes 110, 112 in the crossover housing 70. However, where the crossover housing 70 of FIGS. 8 and 9 is an internal crossover housing, for example as shown in FIGS. 3B and 4B, the crossover holes 110, 112 are provided in the crossover housing 70, as shown in FIG. 8.

Figure 10:
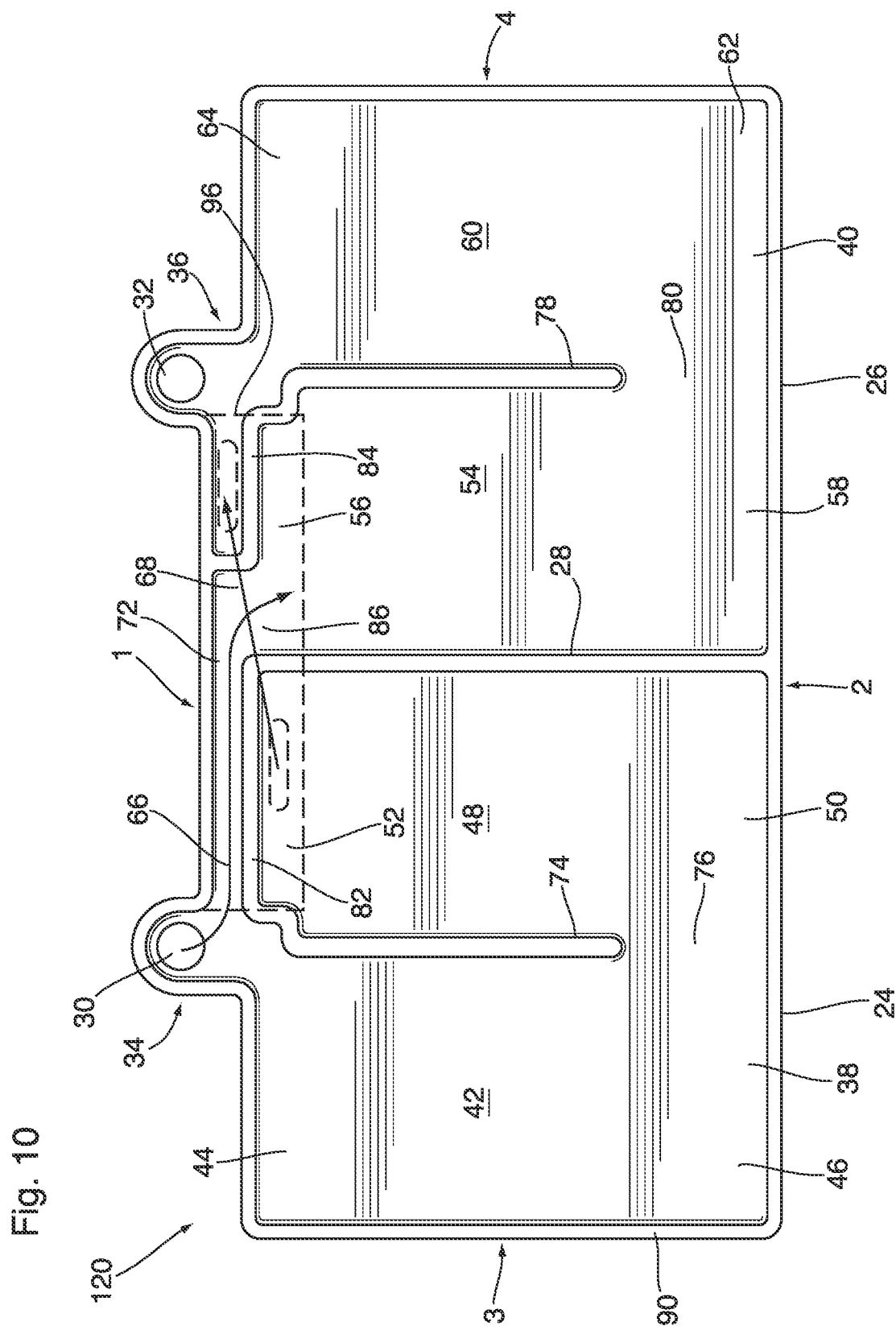
FIG. 10 is an explanatory plan view of a heat exchanger according to a second embodiment.

FIG. 10 is an explanatory view of a heat exchanger 120 according to a second embodiment. Heat exchanger 120 shares a number of like elements with heat exchanger 10 described above, and these like elements are identified with like reference numerals, and the above descriptions of these like elements apply equally to heat exchanger 120, unless otherwise indicated below.

The first plate 12 of heat exchanger 120 may be the mirror image of the first plate of heat exchanger 10, and the second plate 18 of heat exchanger 120 may be the same as the second plate 18 of heat exchanger 10, except for the placement of the crossover holes 110, 112.

In heat exchanger 120, the first crossover passage 66 from the inlet port 30 to the first end 56 of second inlet flow passage 54 is an internal crossover located in the interior space 7 along the inner surface 14 of first wall 5 and plate 12. The second crossover passage 68 from the second end 52 of the first outlet flow passage 48 to the outlet port 32 is an internal or external crossover as described above, located within the central area 102 of crossover housing 70.

Figure 11:
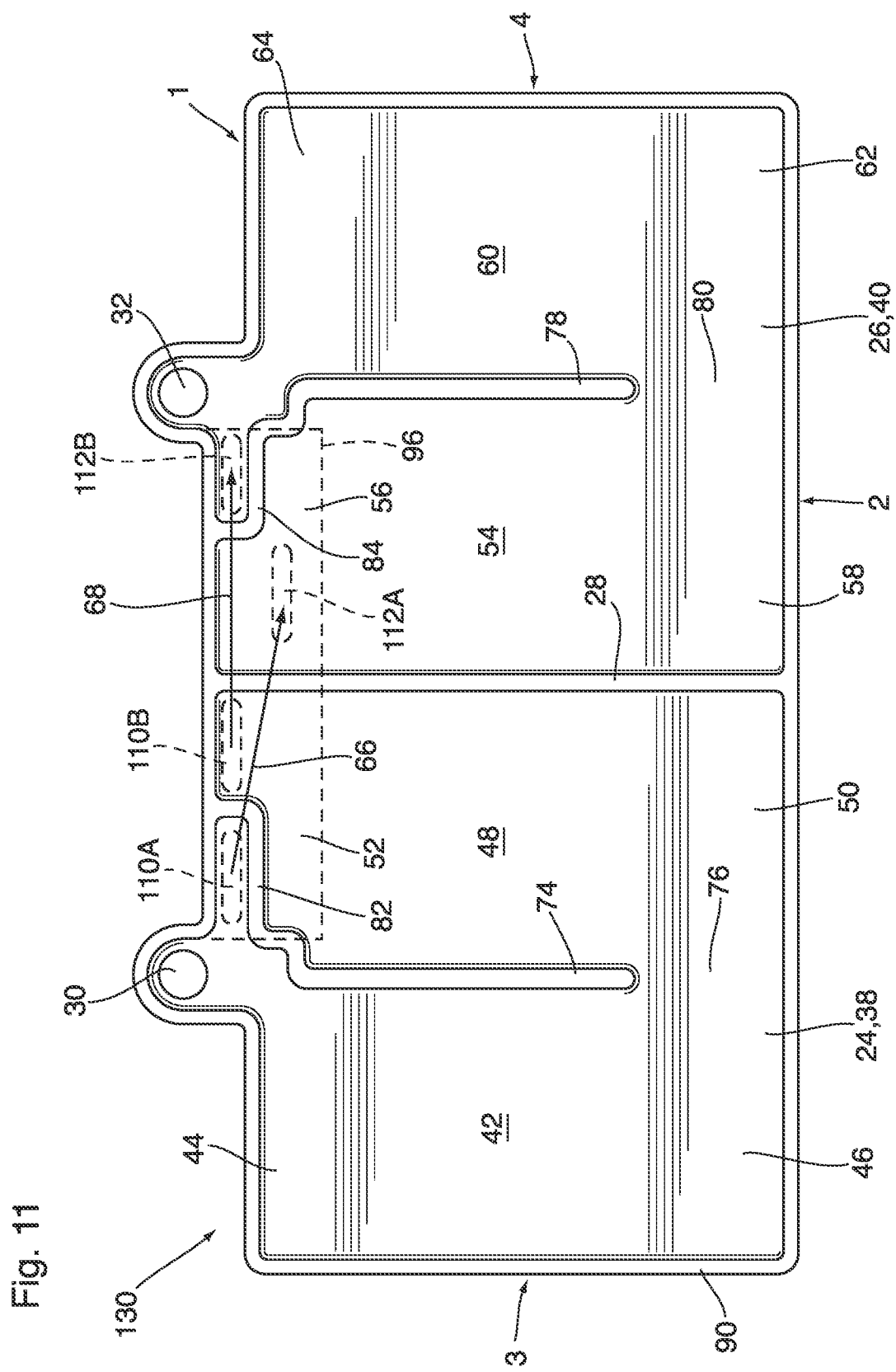
FIG. 11 is an explanatory plan view of a heat exchanger according to a third embodiment.
Figure 12:
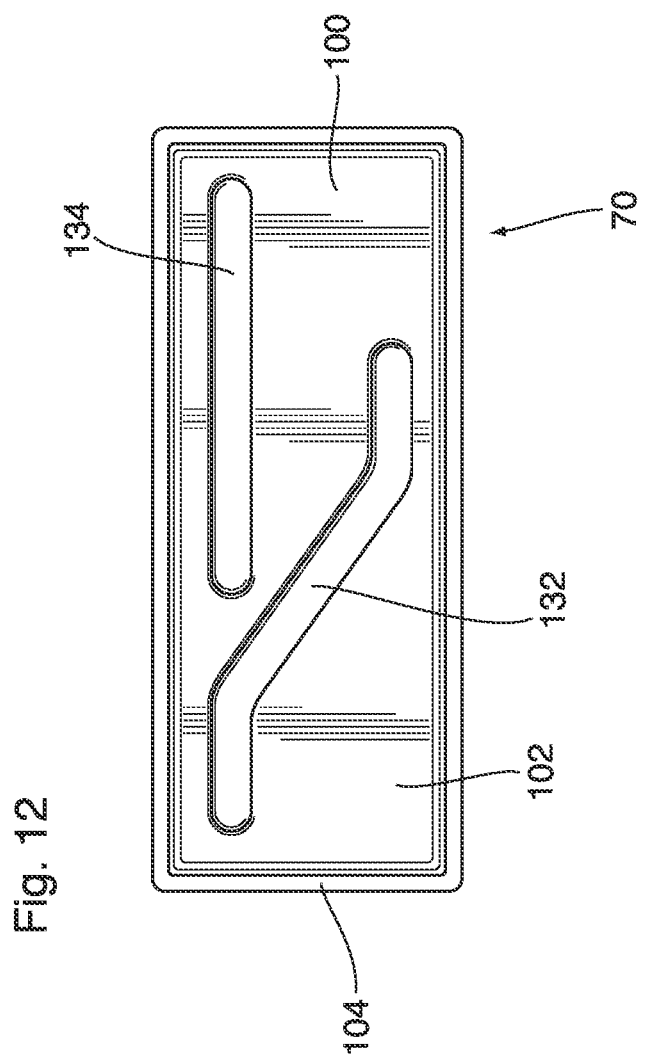
FIG. 12 is a plan view of the crossover housing of the heat exchanger of FIG. 11.

FIG. 11 is an explanatory view of a heat exchanger 130 according to a third embodiment, and FIG. 12 shows a crossover housing 70 of heat exchanger 130. Heat exchanger 130 shares a number of like elements with heat exchanger 10 described above, and these like elements are identified with like reference numerals, and the above descriptions of these like elements apply equally to heat exchanger 130, unless otherwise indicated below.

The first plate 12 of heat exchanger 130 lacks a gap 72 in flow barrier 28, which completely separates the first and second areas 24, 26 from each other. Because there is no gap 72, heat exchanger 130 does not have an internal crossover passage in the internal space 7, as in heat exchangers 10 and 120. Instead, in heat exchanger 130, both the first and second crossover passages 66, 68 are located inside the crossover housing 70, which may be internal or external.

The second crossover passage 68 of heat exchanger 130 is similar to that of heat exchanger 10, extending through the central area 102 of crossover housing 70. However, in heat exchanger 130, the central area 102 is defined with two separate embossments, i.e. first embossment 132 and second embossment 134, wherein the first embossment 132 defines the first crossover passage 66 and the second embossment 134 defines the second crossover passage 68.

The second plate 18 of heat exchanger 130 may be the same as the second plate 18 of heat exchanger 10, except that, in the case of an external crossover housing 70, the flat area 96 is provided with two pairs of crossover holes, a first pair 110A, 112A for the first crossover passage 66 and a second pair 110B, 112B for the second crossover passage 68. Where crossover housing 70 is internal, the central area 102 of crossover housing 70 is provided with two pairs of crossover holes, a first pair 110A, 112A for the first crossover passage 66 and a second pair 110B, 112B for the second crossover passage 68.

Figure 13:
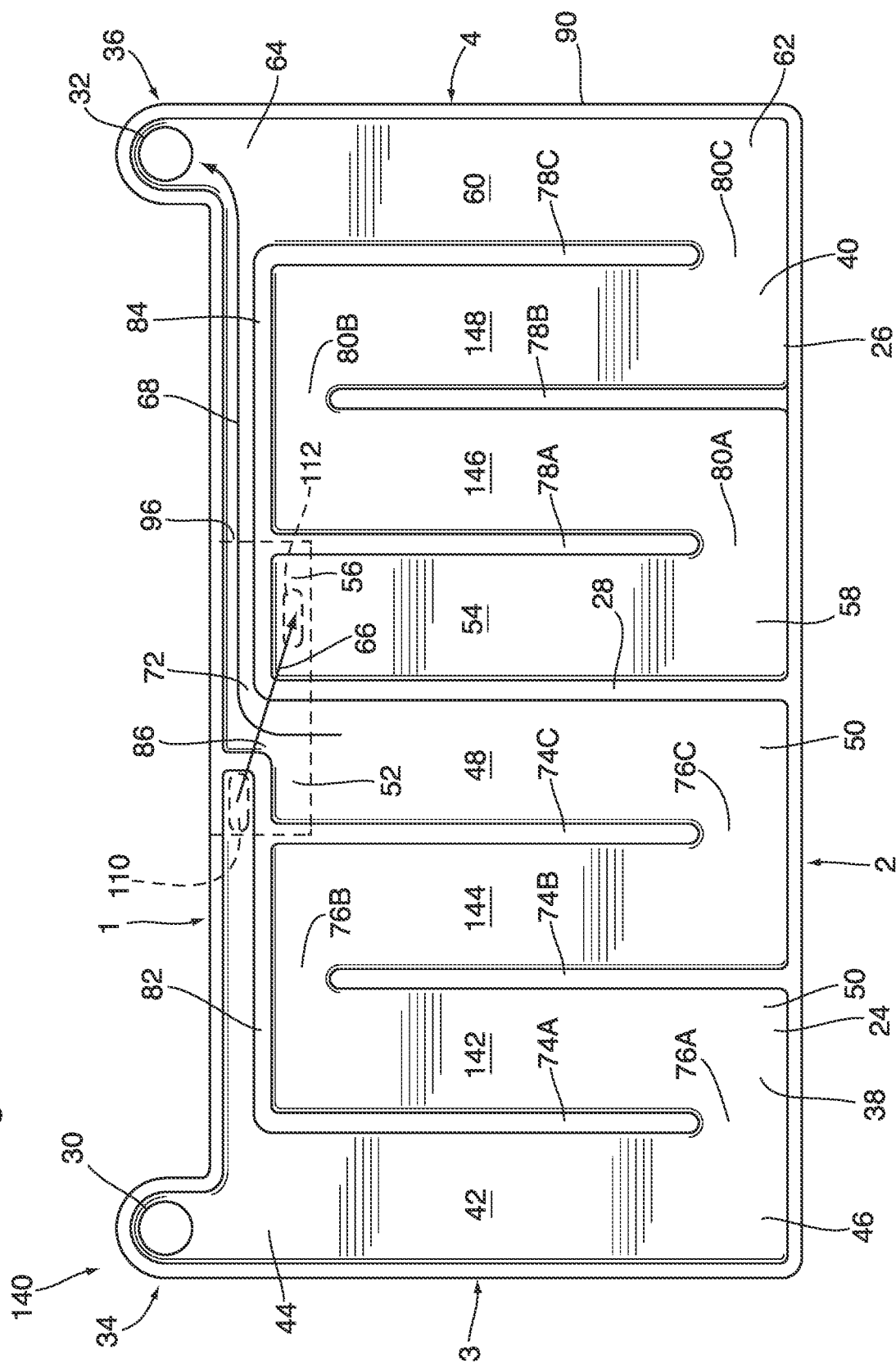
FIG. 13 is an explanatory plan view of a heat exchanger according to a fourth embodiment.

FIG. 13 is an explanatory view of a heat exchanger 140 according to a fourth embodiment. Heat exchanger 140 shares a number of like elements with heat exchanger 10 described above, and these like elements are identified with like reference numerals, and the above descriptions of these like elements apply equally to heat exchanger 140, unless otherwise indicated below.

Heat exchanger 140 differs from heat exchanger 10 in that the first and second pluralities of fluid flow passages 38, 40 include two intermediate flow passages in addition to the inlet flow passage and the outlet flow passage. As a result, the heat transfer fluid makes four longitudinal passes as it passes from the first end of the inlet flow passage to the second end of the outlet flow passage, in each of the areas 24, 26. More specifically, the first plurality of fluid flow passages 38 includes a pair of intermediate fluid flow passages 142, 144 between the first inlet flow passage 42 and the first outlet flow passage 48, and three dividing walls 74A, 74B, 74C with corresponding gaps 76. Similarly, the second plurality of fluid flow passages 40 includes a pair of intermediate fluid flow passages 146, 148 between the second inlet flow passage 54 and the second outlet flow passage 60, and three dividing walls 78A, 78B, 78C with corresponding gaps 80. The crossover housing 70 of heat exchanger 140 may be internal or external.

Figure 14:
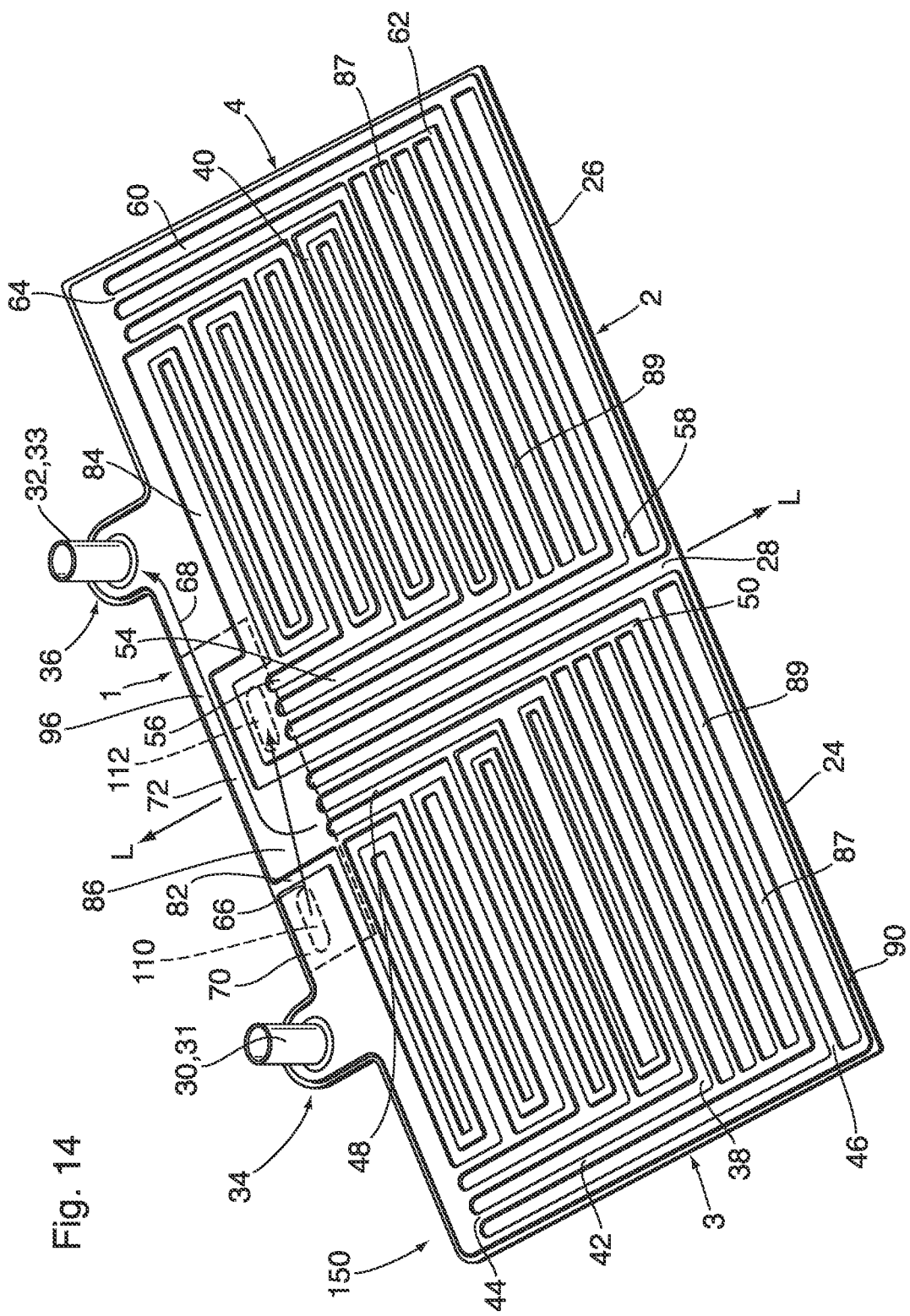
FIG. 14 is an explanatory view of a heat exchanger according to a fifth embodiment.

FIG. 14 is an explanatory view of a heat exchanger 150 according to a fifth embodiment. Heat exchanger 150 shares a number of like elements with heat exchanger 10 described above, and these like elements are identified with like reference numerals, and the above descriptions of these like elements apply equally to heat exchanger 150, unless otherwise indicated below.

In heat exchanger 150 the first and second pluralities of fluid flow passages 38, 40 each define an overall U-shaped fluid flow pattern, such that the heat transfer fluid enters heat exchanger 150 and is discharged therefrom at the first end 1. However, heat exchanger 150 differs from heat exchanger 10 primarily in that the pattern of channel walls 87 and flow channels 89 is more complex than the nested U-shaped pattern of FIG. 1. In this regard, the first and second plurality of fluid flow passages 38, 40 of heat exchanger 150 include a first inlet flow passage 42, first outlet flow passage 48, second inlet flow passage 54 and a second outlet flow passage 60, each comprising a plurality of longitudinally extending flow channels 89 separated by longitudinally extending channel walls 87. Rather than including longitudinally extending dividing walls (i.e. walls 74, 78 described above), however, the first and second pluralities of fluid flow passages 38, 40 of heat exchanger 150 comprise a plurality of transversely extending channels 89 extending between and in flow communication with the longitudinal channels 89. As such, there is longitudinal flow along the outer edges of the first and second pluralities of fluid flow passages 38, 40, and transverse flow across the middles, between the outer edges, thereby providing an overall U-flow configuration.

The widths and arrangement of the channels 89 are optimized to reduce pressure drop through portions of the heat exchanger 150 located farthest from the inlet and outlet ports 30, 32. In this regard, it can be seen that the transverse channels 89 closest to the first end 1 of heat exchanger 150 have a serpentine flow pattern, and are relatively narrow. The pressure drop experienced by the fluid flowing through these channels 89 is relatively high. On the other hand, the transverse channels 89 closer to the second end 2 are straight, and relatively wide. The pressure drop through these channels 89 is relatively low. The inventor has found that optimizing the flow through the heat exchanger 150 in this manner improves the temperature distribution within each of the areas 24, 26.

While various embodiments have been described in connection with the present disclosure, it will be understood that certain adaptations and modifications of the described exemplary embodiments can be made as construed within the scope of the present disclosure. Therefore, the above discussed embodiments are considered to be illustrative and not restrictive.

What is claimed is:
1. A heat exchanger comprising:
 (a) a pair of opposed walls;
 (b) an interior space between the walls;
 (c) a first area and a second area located on opposite sides of a longitudinal axis;
 (d) a flow barrier extending along the longitudinal axis between the first and second areas;
 (e) an inlet port in the first area and an outlet port in the second area;
 (f) a first plurality of fluid flow passages defined within the interior space in the first area, wherein the first plurality of fluid flow passages comprises a first inlet flow passage having a first end and a second end, and a first outlet flow passage having a first end and a second end, wherein the first end of the first inlet flow passage is in flow communication with the inlet port;
 (g) a second plurality of fluid flow passages defined within the interior space in the second area, wherein the second plurality of fluid flow passages comprises a second inlet flow passage having a first end and a second end, and a second outlet flow passage having a first end and a second end, wherein the second end of the second outlet flow passage is in flow communication with the outlet port;
 (h) a first crossover passage extending from the inlet port to the first end of the second inlet flow passage, wherein the first crossover passage extends across the longitudinal axis from the first area to the second area;
 (i) a second crossover passage extending from the second end of the first outlet flow passage to the outlet port, wherein the second crossover passage extends across the longitudinal axis from the first area to the second area; and (j) a crossover housing provided on an inner surface or an outer surface of one of the walls and extending across the longitudinal axis from the first area to the second area;

wherein at least one of the first and second crossover passages is located inside the crossover housing.

2. The heat exchanger according to claim 1, wherein one of the first and second crossover passages is located inside the interior space between the walls, and the other of the first and second crossover passages is located inside the crossover housing.

3. The heat exchanger according to claim 2, wherein the flow barrier includes a gap through which the crossover passage located in the interior space passes.

4. The heat exchanger according to claim 1, wherein the first and second crossover passages are both located inside the crossover housing.

5. The heat exchanger according to claim 1, wherein the inlet port and the outlet port are spaced apart along a transverse axis, and are both located proximate to a first end of the heat exchanger.

6. The heat exchanger according to claim 1, wherein the first plurality of fluid flow passages and the second plurality of fluid flow passages each define a U-shaped fluid flow pattern.

7. The heat exchanger according to claim 1, wherein the first inlet flow passage is separated from the first outlet flow passage by a longitudinally extending first dividing wall, and wherein the second end of the first inlet flow passage is in flow communication with the first end of the first outlet flow passage through a gap provided in the first dividing wall, the gap in the first dividing wall being located proximate to a second end of the heat exchanger, opposite to a first end of the heat exchanger at which the inlet port is provided.

8. The heat exchanger according to claim 1, wherein the second inlet flow passage is separated from the second outlet flow passage by a longitudinally extending second dividing wall, and wherein the second end of the second inlet flow passage is in flow communication with the first end of the second outlet flow passage through a gap provided in the first dividing wall, the gap in the second dividing wall being located proximate to a second end of the heat exchanger, opposite to a second end of the heat exchanger at which the outlet port is provided.

9. The heat exchanger according to claim 1, wherein the first and second pluralities of fluid flow passages each define a serpentine fluid flow pattern, wherein the serpentine fluid flow pattern comprises a plurality of intermediate fluid flow passages between the inlet flow passage and the outlet flow passage.

10. The heat exchanger according to claim 1, comprising first and second embossed plates, wherein each of the embossed plates defines one of the walls of the heat exchanger;

wherein each of the first and second embossed plates comprises a central area surrounded by a planar flange defining a peripheral sealing surface, and wherein the first and second embossed plates are sealingly joined together along their respective peripheral sealing surfaces.

11. The heat exchanger according to claim 10, wherein the flow barrier comprises a longitudinal flow barrier rib embossed in the central area of the first plate and a longitudinal flow barrier rib embossed in the central area of the second plate;

wherein the longitudinal flow barrier ribs of the first and second plates each have sealing surfaces which are coplanar with the peripheral sealing surface; and the sealing surfaces of the flow barrier ribs in the first and second plates are sealingly joined together.

12. The heat exchanger according to claim 10, wherein the first plate has a first crossover rib and a second crossover rib, each of the crossover ribs having a sealing surface which is coplanar with the peripheral sealing surface;

wherein the first crossover rib separates the inlet port or the outlet port from the crossover passage located inside the interior space; and wherein the second crossover rib separates the crossover passage located inside the interior space from one of the first outlet passage or the second inlet passage.

13. The heat exchanger according to claim 1, wherein the pair of opposed walls comprises a first wall and a second wall, and wherein the crossover housing is provided outside the interior space, on an outer surface of the second wall.

14. The heat exchanger according to claim 13, wherein the first crossover passage is located inside an enclosed space of the crossover housing, and wherein first and second crossover holes are provided in the second wall to provide flow communication between the interior space of the crossover housing and the interior space between the first and second walls.

15. The heat exchanger according to claim 14, comprising first and second embossed plates, wherein each of the embossed plates defines one of the walls of the heat exchanger;

wherein each of the first and second embossed plates comprises a central area surrounded by a planar flange defining a peripheral sealing surface, and wherein the first and second embossed plates are sealingly joined together along their respective peripheral sealing surfaces;

wherein the second plate has a flat area to which the crossover housing is sealingly joined, and wherein the inner surface of the second plate, in the flat area thereof, is co-planar with the peripheral sealing surface of the second plate.

16. The heat exchanger according to claim 13, wherein the second crossover passage is located inside the interior space, between the inner surface of the first plate and an inner surface of the second plate.

17. The heat exchanger according to claim 1, wherein the pair of opposed walls comprises a first wall and a second wall, and wherein the crossover housing is provided inside the interior space, between an inner surface of the first wall and an inner surface of the second wall.

18. The heat exchanger according to claim 17, wherein the first crossover passage is located inside an enclosed space of the crossover housing, and wherein first and second crossover holes are provided in the crossover housing to provide flow communication between the interior space of the crossover housing and the interior space between the first and second walls.

19. The heat exchanger according to claim 18, comprising first and second embossed plates, wherein each of the embossed plates defines one of the walls of the heat exchanger;

wherein each of the first and second embossed plates comprises a central area surrounded by a planar flange defining a peripheral sealing surface, and wherein the first and second embossed plates are sealingly joined together along their respective peripheral sealing surfaces;

wherein the second plate has a flat area to which the crossover housing is sealingly joined, and wherein the outer surface of the second plate, in the flat area thereof, is spaced from the peripheral sealing surface in a thickness dimension of the second plate.

20. The heat exchanger according to claim 17, wherein the second crossover passage is located inside the interior space, and extends along the inner surface of the first plate.

21. The heat exchanger according to claim 1, wherein the inlet port and the outlet port are spaced apart along a transverse axis, and are both located proximate to a first end of the heat exchanger;

wherein the first plurality of fluid flow passages and the second plurality of fluid flow passages each define an overall U-shaped fluid flow pattern, having a plurality of longitudinal flow channels on their outer edges and a plurality of transverse channels between the outer edges; and wherein the pressure drop through the transverse channels closest to the first end of the heat exchanger is higher than the pressure drop through the transverse channels closest to the second end.

* * * * *